US012203298B2

(12) United States Patent
Salter et al.

(10) Patent No.: US 12,203,298 B2
(45) Date of Patent: Jan. 21, 2025

(54) TWO TONED VEHICLE DOOR HANDLES

(71) Applicant: FORD GLOBAL TECHNOLOGIES, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US); David Brian Glickman, Southfield, MI (US); Hussein H. Berry, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1351 days.

(21) Appl. No.: 16/816,572

(22) Filed: Mar. 12, 2020

(65) Prior Publication Data

US 2021/0283807 A1   Sep. 16, 2021

(51) Int. Cl.
| E05B 85/10 | (2014.01) |
| B29C 45/00 | (2006.01) |
| B32B 15/08 | (2006.01) |
| E05B 85/12 | (2014.01) |
| B29L 31/46 | (2006.01) |
| E05B 81/78 | (2014.01) |

(52) U.S. Cl.
CPC .......... *E05B 85/10* (2013.01); *B29C 45/0053* (2013.01); *B29C 2045/0079* (2013.01); *B29L 2031/463* (2013.01); *E05B 81/78* (2013.01)

(58) Field of Classification Search
CPC ......... E05B 85/10; E05B 85/12; B32B 15/08; B32B 2605/08
See application file for complete search history.

(56) References Cited

U.S. PATENT DOCUMENTS

| 4,115,619 A * | 9/1978 | Kurfman ................. B32B 15/08 428/458 |
| 6,954,967 B2 | 10/2005 | Park et al. |
| 7,548,210 B2 | 6/2009 | Hashiguchi et al. |
| 2005/0073804 A1 | 4/2005 | Maruyama et al. |
| 2006/0176710 A1* | 8/2006 | Meinke ................. B60R 13/005 362/503 |

FOREIGN PATENT DOCUMENTS

JP    5247233 B2    7/2013

* cited by examiner

*Primary Examiner* — Joanna Pleszczynska
(74) *Attorney, Agent, or Firm* — Vichit Chea; Carlson, Gaskey & Olds, P.C.

(57) ABSTRACT

This disclosure details two toned door handles for vehicle doors. An exemplary two toned door handle may include a non-metallized portion and a metallized portion. The metallized portion may include a metallic layer that is transparent to signals sent and received by an antenna module packaged inside the two toned door handle. Exemplary methods for cost-effectively manufacturing the two toned door handle are also disclosed.

17 Claims, 5 Drawing Sheets

TWO TONED VEHICLE DOOR HANDLES

TECHNICAL FIELD

This disclosure relates generally to vehicle door handles, and more particularly to two toned vehicle door handles that provide both a non-metallized appearance and a metallized appearance.

BACKGROUND

Motor vehicles include doors with handles. The handles are provided on both the exterior and the interior of the doors and are utilized to open or close the doors. Manufactures may desire to imbed antenna modules within the door handles for tracking and/or authenticating authorized users of the vehicle. Door handles that include metallic materials typically do not include imbedded antenna modules because of the potential for the metallic materials to interfere with signal communications to and from the antenna modules.

SUMMARY

A vehicle according to an exemplary aspect of the present disclosure includes, among other things, a door and a two toned door handle secured to the door and including a non-metallized portion and a metallized portion. The metallized portion includes a metallic layer comprised of indium.

In a further non-limiting embodiment of the foregoing vehicle, the metallic layer is disposed between a base layer and an outer layer.

In a further non-limiting embodiment of either of the foregoing vehicles, the base layer includes an UV curable coating and the outer layer includes an UV based coating.

In a further non-limiting embodiment of any of the foregoing vehicles, the outer layer is tinted.

In a further non-limiting embodiment of any of the foregoing vehicles, the metallic layer comprises 99.99% pure indium.

In a further non-limiting embodiment of any of the foregoing vehicles, an antenna module is packaged within a handle body of the two toned door handle. The metallic layer is signal transparent to signals communicated to or from the antenna module.

In a further non-limiting embodiment of any of the foregoing vehicles, a molded-in ditch is formed in a thermoplastic substrate of the two toned door handle.

In a further non-limiting embodiment of any of the foregoing vehicles, the non-metallized portion is colored, and the metallized portion exhibits a chrome-like appearance.

In a further non-limiting embodiment of any of the foregoing vehicles, the two toned door handle is secured at an interior surface of the door.

In a further non-limiting embodiment of any of the foregoing vehicles, the two toned door handle is secured at an exterior surface of the door.

In a further non-limiting embodiment of any of the foregoing vehicles, the metallic layer includes a thickness between about 0.1 µm and about 5 µm.

In a further non-limiting embodiment of any of the foregoing vehicles, the thickness of the metallic layer is between about 0.1 µm and about 0.2 µm.

A method according to another exemplary aspect of the present disclosure includes, among other things, molding a door handle for a vehicle door in a single color, masking a first portion of the door handle, and metalizing a second portion of the door handle. The first portion of the door handle includes a non-metalized appearance and the second portion of the door handle includes a metallized appearance.

In a further non-limiting embodiment of the foregoing method, molding the door handle includes molding a single-piece thermoplastic substrate of the door handle via an induction heated injection molding process.

In a further non-limiting embodiment of either of the foregoing methods, an injection mold used in the induction heated injection molding process includes an induction heating element and a water cooling line.

In a further non-limiting embodiment of any of the foregoing methods, masking the first portion of the door handle includes applying a mask to the first portion of the door handle via a ditch formed in the first portion.

In a further non-limiting embodiment of any of the foregoing methods, metalizing the second portion of the door handle includes applying a metallic layer over the second portion of the door handle via a physical vapor deposition (PVD) technique.

In a further non-limiting embodiment of any of the foregoing methods, prior to applying the metallic layer, the method includes applying a base layer to the second portion of the door handle.

In a further non-limiting embodiment of any of the foregoing methods, after applying the metallic layer, the method includes applying an outer layer over the metallic layer.

In a further non-limiting embodiment of any of the foregoing methods, the metallic layer includes indium.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details two toned door handles for vehicle doors. An exemplary two toned door handle may include a non-metallized portion and a metallized portion. The metallized portion may include a metallic layer that is transparent to signals sent and received by an antenna module packaged inside the two toned door handle. Exemplary methods for cost-effectively manufacturing the two toned door handle are also disclosed. These and other features of this disclosure are described in greater detail in the following paragraphs of this detailed description.

Figure 1:
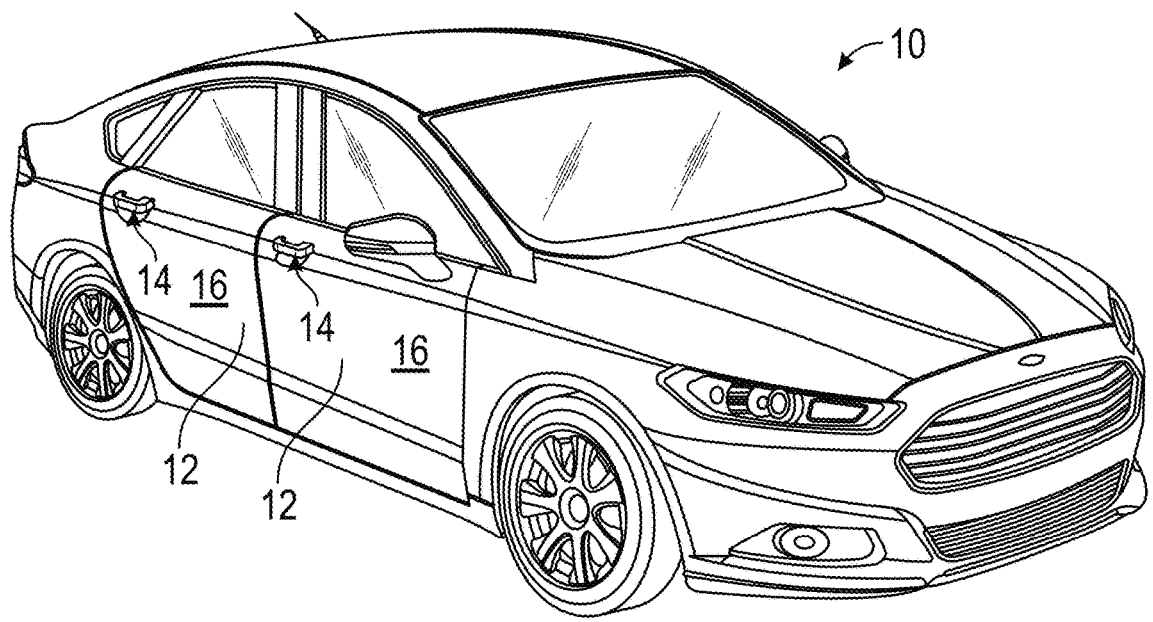
FIG. 1 is a perspective view of a motor vehicle.

FIG. 1 schematically illustrates a vehicle 10. The vehicle 10 may be a car, a truck, a van, a sport utility vehicle, or any other type of motor vehicle. The vehicle 10 could also be a conventional motor vehicle, a battery powered hybrid or electric vehicle, or an autonomous vehicle.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 may include front and rear doors, which are collectively referred to herein as the doors 12. In the illustrated embodiment, a four door vehicle is shown. However, this disclosure extends to vehicles having at least one door.

Each door 12 of the vehicle 10 may include a door handle 14. The door handle 14 may be secured at an exterior surface 16 of the door 12. Provided the door handle 14 is accessible and the door 12 is unlatched, a user can pull the door handle 14 to move the door 12 from the closed position shown in FIG. 1 to an open position. The user can gain ingress into the vehicle 10 when the door 12 is in the open position.

Figure 2:
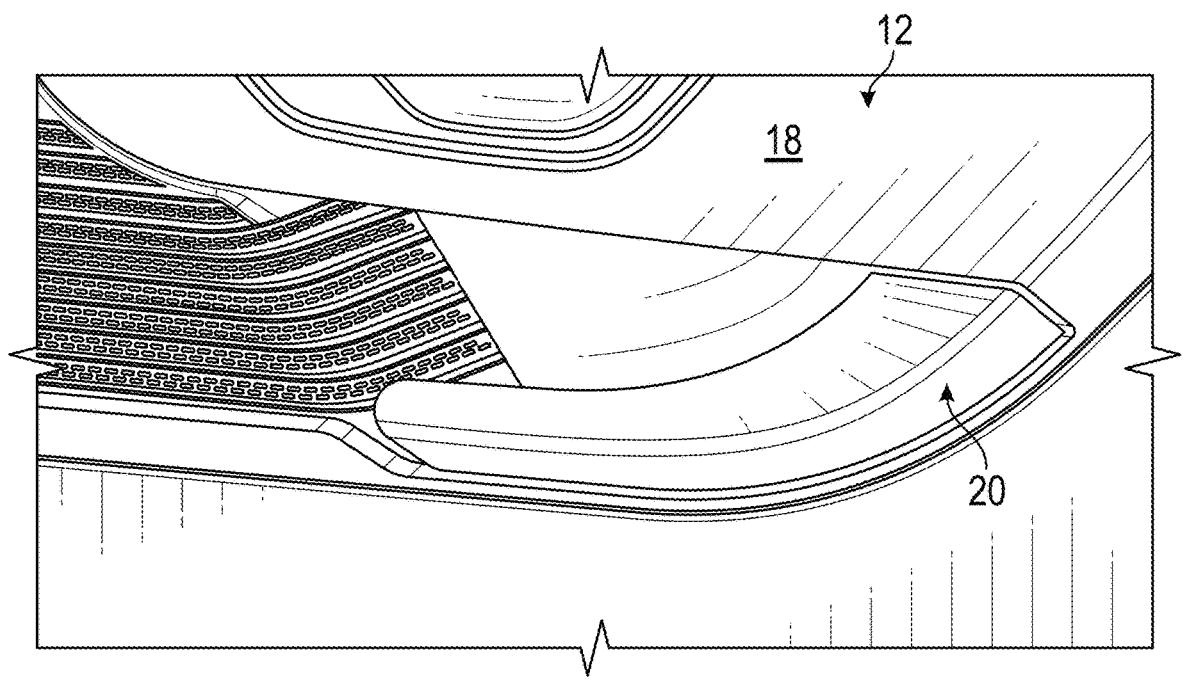
FIG. 2 illustrates select portions of an interior portion of a door of the vehicle of FIG. 1.

FIG. 2 illustrates an interior surface 18 of one of the doors 12 of the vehicle 10 of FIG. 1. An additional door handle 20 may be secured at the interior surface 18 of the door 12. A user can push or pull on the door handle 20 to move the door 12 between open and closed positions from inside a passenger cabin of the vehicle 10.

The door handles 14, 20 of FIGS. 1-2 may or may not be connected to a door latching mechanism. Therefore, the door handles 14, 20 may be either movable handles or stationary handles. Thus, this disclosure is applicable to both movable and stationary door handles.

Some vehicle customers may desire that the door handles 14, 20 provide a sleek and upscale appearance. Furthermore, manufactures may desire to embed antenna modules within the door handles 14, 20 for tracking and/or authenticating authorized users of the vehicle 10, such as via a radio frequency identification (RFID) system or passive entry passive start (PEPS) system, for example. However, depending on the materials and manufacturing processes used, the door handles 14, 20 may not adequately transmit signals through the various materials and coatings of the door handles 14, 20. Accordingly, exemplary door handles that provide both an attractive appearance and that are capable of receiving and transmitting signals via embedded antenna modules are proposed within this disclosure.

Figure 3:
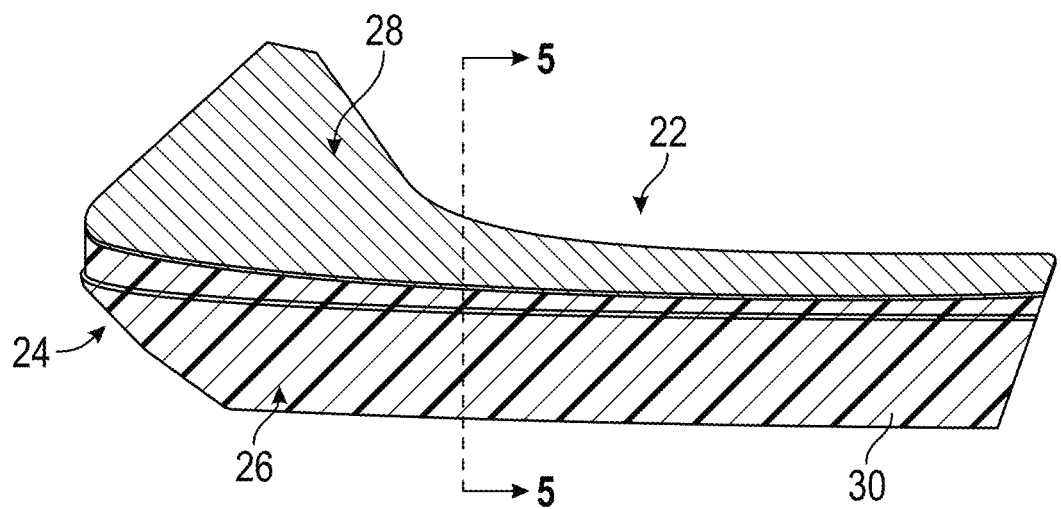
FIG. 3 illustrates a two toned door handle for a vehicle door.
Figure 4:
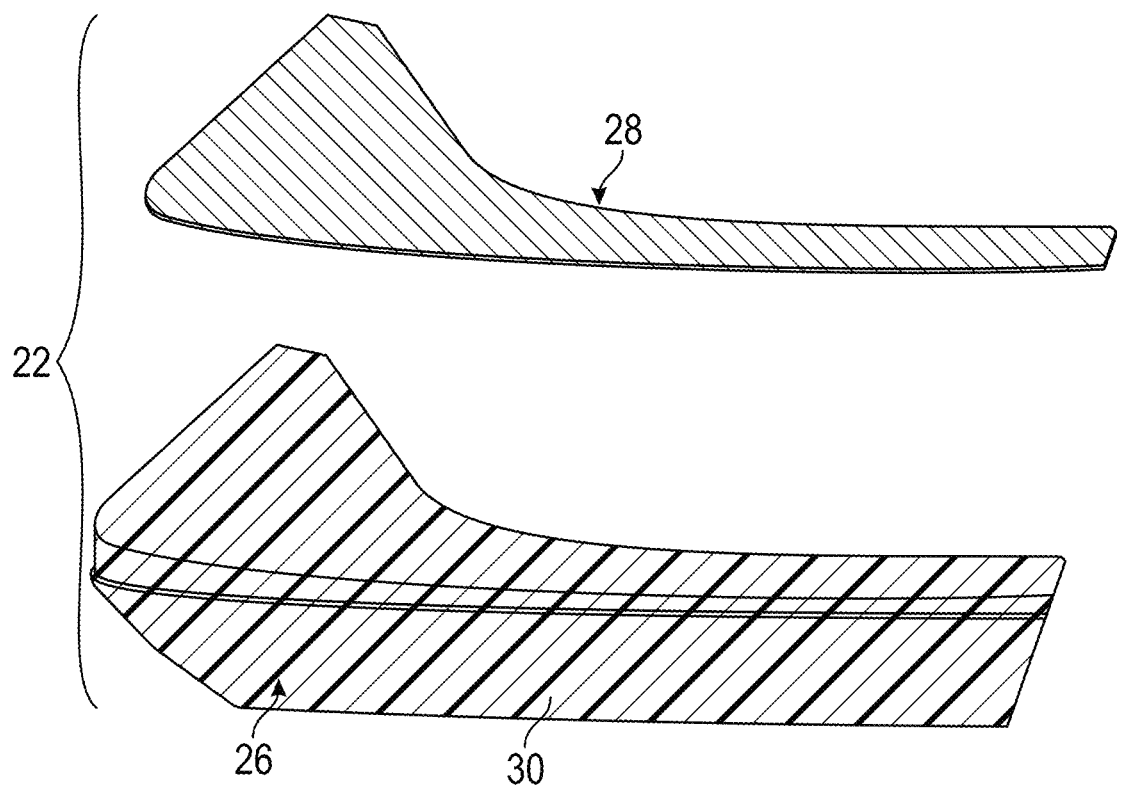
FIG. 4 is an exploded view of the two toned door handle of FIG. 3.
Figure 5:
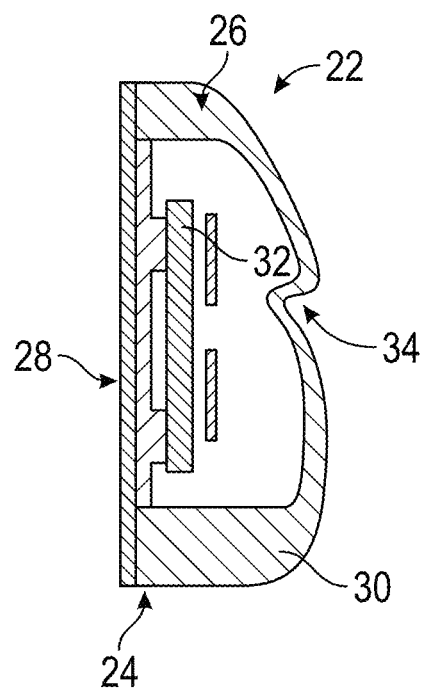
FIG. 5 is a cross-sectional view through section 5-5 of FIG. 3.

FIGS. 3, 4, and 5 illustrate an exemplary two toned door handle 22 for a vehicle door. The two toned door handle 22 can be secured at either an exterior surface or an interior surface of a vehicle door to provide a sleek, upscale appearance.

The two toned door handle 22 includes a handle body 24. In an embodiment, the handle body 24 is L-shaped and includes a curved contour that allows users to ergonomically push/pull the two toned door handle 22 when mounted to a vehicle door. However, the size and shape of the handle body 24 of the two toned door handle 22 are not intended to limit this disclosure.

The handle body 24 of the two toned door handle 22 may include one or more non-metallized portions 26 and one or more metallized portions 28. Together, the non-metallized portion(s) 26 and the metallized portion(s) 28 provide the "two toned" appearance of the two toned door handle 22.

In an embodiment, side surfaces of the handle body 24 are configured as the non-metallized portions 26, and an upper and/or lower surface of the handle body 24 is configured as the metallized portion 28. However, other configurations are also contemplated within the scope of this disclosure.

Each non-metallized portion 26 includes a non-metallized appearance established by exterior surfaces of a thermoplastic substrate 30 of the handle body 24. The thermoplastic substrate 30 may be made of a high strength structural thermoplastic material that is tough enough to withstand daily usage of the two toned door handle 22. Suitable materials for constructing (e.g., molding) the thermoplastic substrate 30 include, but are not limited to, polycarbonate (PC), nylon, or thermoplastic alloys such as PC/acrylic-styrene-acrylate terpolymer (ASA), PC/Acrylic alloy, PC/Acrylonitrile butadiene styrene (ABS), etc. The non-metalized portion 26 may provide a colored appearance, such as in black or any other desired accent color.

Each metallized portion 28 includes a metallic or chrome-like appearance established by plating portions of the thermoplastic substrate 30 with one or more metallic layers. The metallized portion(s) 28 therefore includes a different color and appearance than the non-metallized portion(s) 26.

Referring now primarily to FIG. 5, an antenna module 32 may be imbedded within or otherwise packaged inside the handle body 24 of the two toned door handle 22. The antenna module 32 is configured to track the activities of and authenticate authorized users of a vehicle equipped with the two toned door handle 22, such as for automatically locking or unlocking a door of the vehicle, for example.

In an embodiment, the antenna module 32 is packaged beneath the metallized portion 28 of the two toned door handle 22. The metallized portion 28 may be made of a material or combination of materials that is transparent to signals, such as radio frequency (RF) signals, radar signals, infrared signals, Bluetooth low energy (BLE) signals, etc., that may be sent and received by the antenna module 32.

The antenna module 32 may be a low frequency device that includes both a receiver and a transmitter, such as a Bluetooth Low Energy Antenna Module (BLEAM), for example. The antenna module 32 may be part of a capacitive or infrared sensor system, a radio frequency identification (RFID) system, a passive entry passive start (PEPS) system, etc.

The handle body 24 of the two toned door handle 22 may additionally include a ditch 34 formed in the thermoplastic substrate 30. The ditch 34 may be a slight recess formed in an exterior portion of the thermoplastic substrate 30, and as further discussed below, can be used during decorating steps to accommodate a mask that is applied to the handle body 24 prior to forming the metallized portion 28 on the thermoplastic substrate 30.

Figure 6:
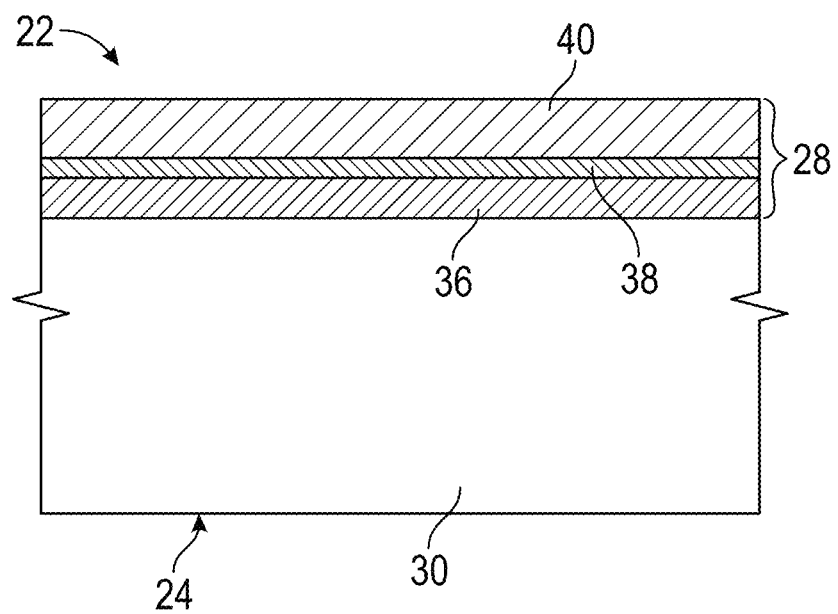
FIG. 6 schematically illustrates a metallized portion of a two toned door handle.

FIG. 6 further illustrates select features of the metallized portion 28 of the two toned door handle 22. The metallized portion 28 may include a base layer 36, a metallic layer 38, and an outer layer 40 that are applied over the thermoplastic substrate 30 of the handle body 24.

The base layer 36 of the metallized portion 28 is configured for improving adhesion between the metallic layer 38 and the thermoplastic substrate 30. The base layer 36 may be an UV curable coating, such as UVB315 basecoat sold by Red Spot Paint & Varnish Company, Inc. However, other suitable coatings could be employed as the base layer 36 within the scope of this disclosure depending on the respective materials of the metallic layer 38 and the thermoplastic substrate 30, among other factors. In an embodiment, a thickness of the base layer 36 is between about 10 µm and about 15 µm. In this disclosure, the term "about" means that the expressed quantities or ranges need not be exact but may be approximated and/or larger or smaller, reflecting acceptable tolerances, conversion factors, measurement error, etc.

The metallic layer 38 is configured to provide the metallic or chrome-like appearance of the metallized portion 28. In an embodiment, the metallic layer 38 includes indium, such as 99.99% pure indium. The use of indium within the metallic layer 38 may provide numerous advantages such as transparency to signals sent from or received by the antenna module 32, a low vapor pressure, and providing for a bright, chrome-like appearance that forms a protective oxide layer over the handle body 24. In an embodiment, a thickness of the metallic layer 38 is between about 0.1 µm and about 5 µm. In another embodiment, the thickness of the metallic layer 38 is between about 0.1 µm and about 0.2 µm.

The outer layer 40 of the metallized portion 28 is configured for sealing and protecting the metallic layer 38 from wear and tear, and in exterior door implementations, for protecting the two toned door handle 22 from the elements. The outer layer 40 may be an UV based coating, such as UVT783 topcoat sold by Red Spot Paint & Varnish Company, Inc. However, other suitable coatings could be employed as the outer layer 40 within the scope of this disclosure depending on the material make-up of the metallic layer 38, among other factors. In an embodiment, a thickness of the outer layer 40 is between about 15 µm and about 20 µm.

As would be understood by persons of ordinary skill in the art, the respective thicknesses of the base layer 36, the metallic layer 38, and the outer layer 40 of the metallized portion 28 are not necessarily shown to the scale they would be in practice. Rather, these features have been exaggerated in FIG. 6 to better illustrate the various features of the metallized portion 28 of the two toned door handle 22.

Figure 7:
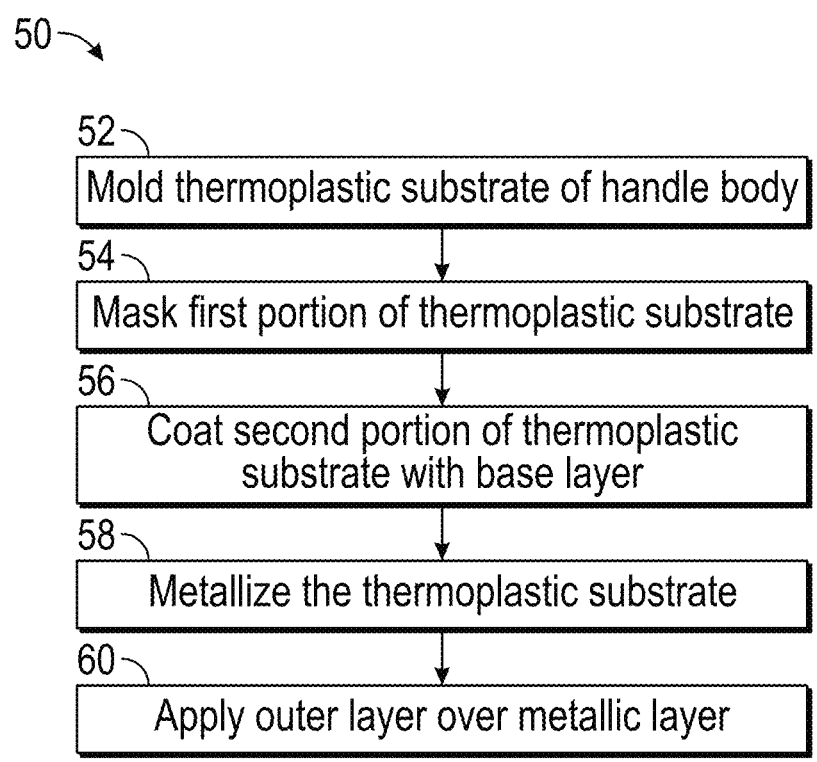
FIG. 7 schematically illustrates a method for manufacturing a two toned door handle for a vehicle door.

FIG. 7 schematically illustrates, in sequential order, an exemplary method 50 for manufacturing the two toned door handle 22 discussed above with reference to FIGS. 1-6. It should be understood that fewer or additional steps than are recited below could be performed, and the specific recited order of steps shown in FIG. 7 is not intended to limit this disclosure.

First, at block 52, the thermoplastic substrate 30 is molded in a molding process to form the handle body 24 of the two toned door handle 22. The molding process may be an injection molding process or any other suitable molding process. The molding process may include forming the handle body 24 in-color (e.g., in black or any other desirable accent color) and in a single piece from a high gloss thermoplastic structural material. The ditch 34 may be formed in the thermoplastic substrate 30 during the molding process.

Figure 8:
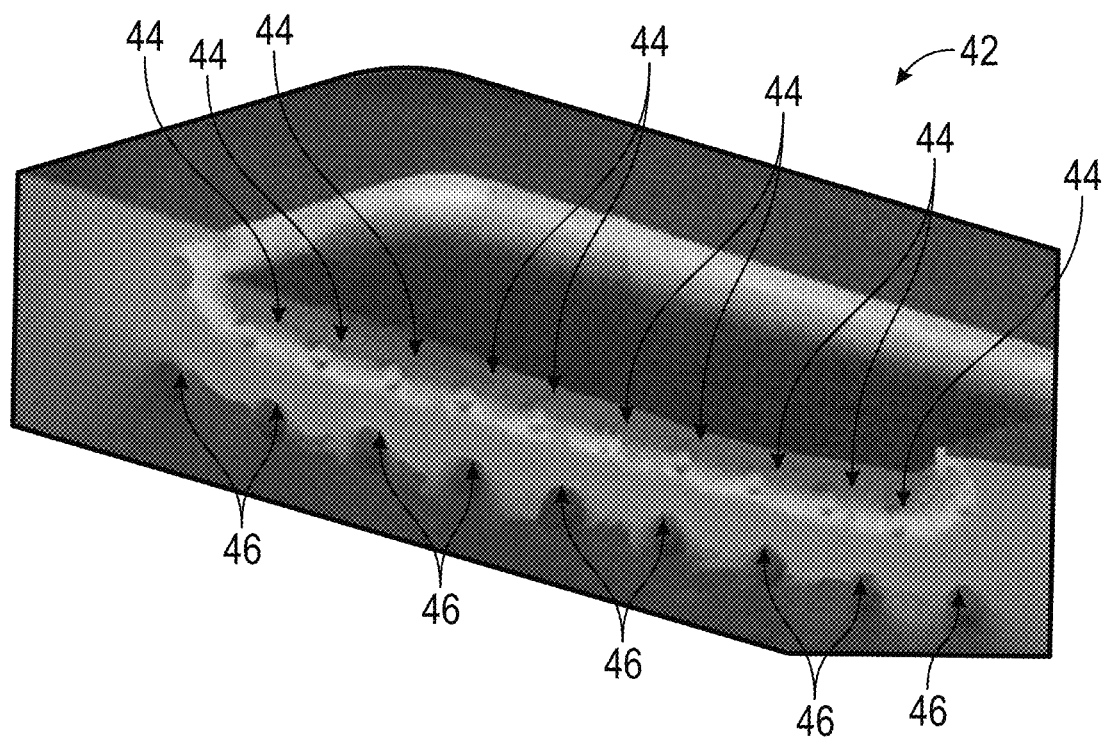
FIG. 8 illustrates select portions of an injection mold used during a molding step of the method of FIG. 7.

An exemplary molding process may include molding the thermoplastic substrate 30 in an induction heated injection mold. An exemplary injection mold 42 is illustrated in FIG. 8. The injection mold 42 may be heated (e.g., via an induction heating element 44) to a temperature that is within a few degrees of the melting temperature (typically between 140° and 160° C. (284° and 320° F.)) of the thermoplastic material of the thermoplastic substrate 30 and then held at that temperature until a cavity of the injection mold 42 is filled with the thermoplastic material. The injection mold 42 may then be rapidly cooled, such as via water cooling lines 46 formed within the injection mold 42, for example. This combination of induction heating with rapid cooling increases the hardness of the thermoplastic substrate 30, thereby resulting in a part having a relatively high scratch resistant outer surface.

Figure 9:
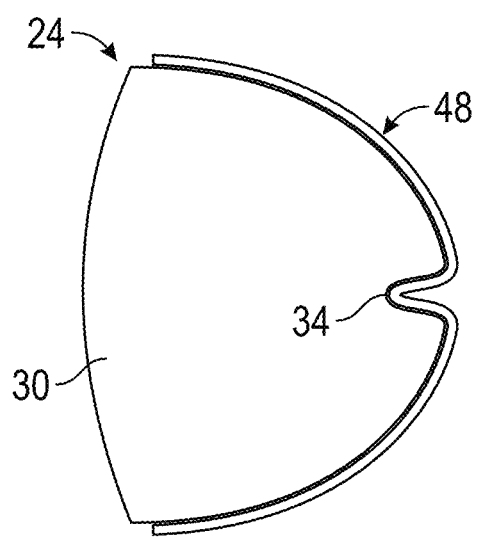
FIG. 9 schematically illustrates a masking step of the method of FIG. 7.

Next, at block 54, the thermoplastic substrate 30 may be prepped for subsequent decorating steps by masking select portions of the thermoplastic substrate 30. An exemplary mask 48 for masking the thermoplastic substrate 30 is illustrated in FIG. 9. The mask 48 may be secured to a first portion of the thermoplastic substrate 30 using the ditch 34 and is configured to cover the portions of the thermoplastic substrate 30 that will provide the non-metallized portions 26 of the two toned door handle 22 (i.e., to cover the portions of the thermoplastic substrate 30 where metallic plating is not desired). The ditch 34 provides a surface for establishing a clear break line in the mask 48 and simplifies the overall masking process. In an embodiment, the mask 48 is a molded or vacuum formed plastic mask. In another embodiment, the mask 48 is a die-cut adhesive masking tape.

A second portion (e.g., a non-masked surface) of the thermoplastic substrate 30 may be coated with the base layer 36 at block 56. The base layer 36 may be applied using any known technique. The second portion of the thermoplastic substrate 30 may include a non-masked surface that is uncovered by the mask 48 and at which a metallized or chrome-like appearance is desired.

Next, at block 58, the thermoplastic substrate 30 may be metalized. For example, the metallic layer 38 may be applied over top of the base layer 36 using a physical vapor deposition (PVD) technique to sputter a relatively thin metallic coating onto the thermoplastic substrate 30. Other techniques may also be suitable for applying the metallic layer 38. The metallic layer 38 establishes the metallic or chrome-like appearance of the two toned door handle 22. The properties of the metallic layer 38 can be controlled during the PVD process to provide any number of surface finishes and appearances.

Finally, the outer layer 40 may be applied over the metallic layer 38 at block 60. The outer layer 40 protects the metallic layer 38. The outer layer 40 may be applied using any known technique. The outer layer 40 may be tinted to provide a near limitless portfolio of potential finishes. In addition, a gloss of the outer layer 40 can be varied from matte to high gloss to provide design flexibility. Together, the base layer 36, the metallic layer 38, and the outer layer 40 establish the metallized portion 28, which provides the metallic or chrome-like appearance to select portions of the two toned door handle 22.

The two toned vehicle door handles of this disclosure provide a sleek and attractive appearance that is aesthetically pleasing to customers. The exemplary two toned door handles can be manufactured cost effectively by avoiding the need to mold a separate metallized accent piece that must be attached to the thermoplastic substrate. Moreover, by using materials that are transparent to RF or radar frequency devices, antenna modules can advantageously be imbedded or otherwise housed within the exemplary two toned door handles for tracking user activities.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
    a door;
    a two toned door handle secured to the door and including a non-metallized portion and a metallized portion, wherein the metallized portion includes a metallic layer comprised of indium;
    a molded-in ditch formed in a thermoplastic substrate of the two toned door handle,
    wherein the molded-in ditch is a recess formed in an exterior portion of the thermoplastic substrate and is located on an opposite side of the thermoplastic substrate from the metallized portion; and
    a mask secured to the thermoplastic substrate at the molded-in ditch.

2. The vehicle as recited in claim 1, wherein the metallic layer is disposed between a base layer and an outer layer.

3. The vehicle as recited in claim 2, wherein the base layer and the outer layer each includes an UV coating.

4. The vehicle as recited in claim 2, wherein the outer layer is tinted.

5. The vehicle as recited in claim 1, wherein the metallic layer comprises 99.99% pure indium.

6. The vehicle as recited in claim 1, comprising an antenna module packaged within a handle body of the two toned door handle, wherein the metallic layer is signal transparent to signals communicated to or from the antenna module.

7. The vehicle as recited in claim 1, wherein the non-metallized portion is colored and the metallized portion exhibits a chrome-like appearance.

8. The vehicle as recited in claim 1, wherein the two toned door handle is secured at an interior surface of the door.

9. The vehicle as recited in claim 1, wherein the two toned door handle is secured at an exterior surface of the door.

10. The vehicle as recited in claim 1, wherein a thickness of the metallic layer is between about 0.1 μm and about 5 μm.

11. The vehicle as recited in claim 10, wherein the thickness of the metallic layer is between about 0.1 μm and about 0.2 μm.

12. The vehicle as recited in claim 6, wherein the handle body is L-shaped.

13. The vehicle as recited in claim 1, wherein the molded-in ditch provides a break line in the mask.

14. The vehicle as recited in claim 1, wherein the mask covers the non-metallized portion of the two toned door handle.

15. The vehicle as recited in claim 1, wherein the mask is a plastic mask.

16. The vehicle as recited in claim 1, wherein the mask is an adhesive masking tape.

17. A vehicle, comprising:
    a door;
    a two toned door handle secured to the door and including a handle body having a thermoplastic substrate;
    a non-metallized portion of the handle body provided at a first exterior surface of the thermoplastic substrate;
    a metallized portion of the handle body provided at a second exterior surface of the thermoplastic substrate, wherein the metallized portion includes a metallic layer comprised of 99.99% pure indium;
    a ditch formed in the first exterior surface of the thermoplastic substrate, wherein the ditch extends in a direction toward the second exterior surface; and
    a mask secured to the thermoplastic substrate at the ditch and arranged to cover the non-metallized portion.

* * * * *